No. 679,540. Patented July 30, 1901.
G. W. PACKER.
CHUCK OR DIE FOR POINTING OR ROUNDING ENDS OF BOLTS.
(Application filed Nov. 7, 1900.)

(No Model.)

Witnesses:

Inventor:
George W. Packer,
By Banning & Banning,
Attorneys.

UNITED STATES PATENT OFFICE.

GEORGE W. PACKER, OF CHICAGO, ILLINOIS, ASSIGNOR TO THE DEERING HARVESTER COMPANY, OF SAME PLACE.

CHUCK OR DIE FOR POINTING OR ROUNDING ENDS OF BOLTS.

SPECIFICATION forming part of Letters Patent No. 679,540, dated July 30, 1901.

Original application filed August 2, 1900, Serial No. 25,637. Divided and this application filed November 7, 1900. Serial No. 35,754. (No model.)

*To all whom it may concern:*

Be it known that I, GEORGE W. PACKER, a citizen of the United States, and a resident of Chicago, in the county of Cook and State of Illinois, have invented a certain new and useful Improvement in Chucks or Dies for Pointing or Rounding the Ends of Bolts, of which the following is a specification, the same being a division of my application, Serial No. 25,637, filed August 2, 1900.

This invention relates to dies or chucks primarily designed for pointing or rounding the ends of bolts or bolt-blanks, but which can be used for pointing or rounding the ends of other articles or devices.

The object of the invention is to construct a chuck or die by means of which the pointing or rounding operation will be performed quickly and in a positive, reliable, and uniform manner in each instance; and the invention consists in the features of construction and combination of parts hereinafter described and claimed.

Figure 1:
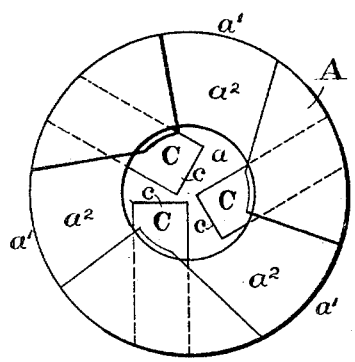
Figure 2:
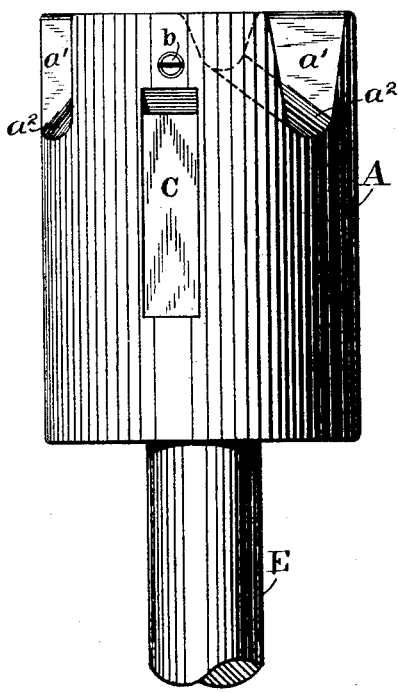
Figure 3:
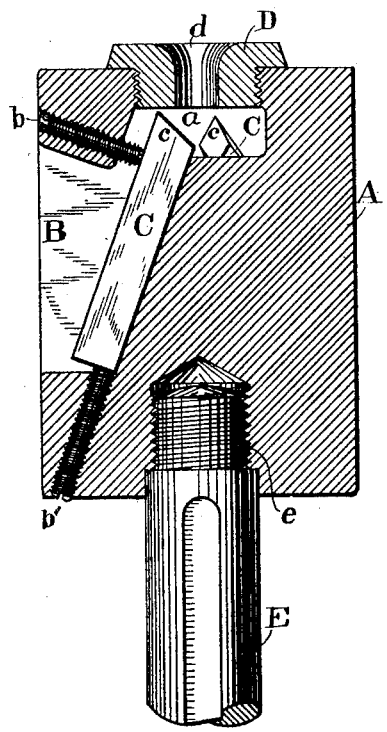

In the drawings illustrating the invention, Figure 1 is an end elevation or plan view of the acting end of the pointing or rounding chuck or die and its cutters or tools; Fig. 2, a side elevation of the same; and Fig. 3, a cross-section of the head of the chuck or die, showing one of the cutters and its adjusting and locking screws in elevation and showing also the driving shaft or spindle in elevation.

The chuck or die is constructed with a head or support A, preferably of a cylindrical shape and of a sufficient length to receive and carry the cutters or tools. This head or block A in the arrangement shown has in its body three openings or slots B, each of which receives a cutter or tool C, which stands at an inward inclination, for which purpose the inner wall of the opening or slot is on an incline, with the inclines of the inner walls of the several slots or openings running to a common central point. Each cutter or tool has an acting or cutting end $c$, with its sides beveled and its cutting end or edge on an incline, as clearly shown in Fig. 3, and this construction of cutting end in conjunction with the incline of the cutters or tools forms a central space within the line of the cutting edges, which space is of a tapered or cone formation, by which the pointing or rounding effect is produced in the operation of the chuck or die. Each cutter is held firmly when inserted by a set-screw $b$, which forces the cutter or tool firmly against the inclined wall of the slot or opening, and a correct and proper projection of the acting end of each cutter or tool is secured by an adjusting-screw $b'$, by means of which the cutter or tool as a whole can be advanced or receded, as required, for the adjustment of its acting end. The cutters or tools C are each entered into its opening or slot in the body of the head or block and are each adjusted endwise for positioning the acting end by the adjusting-screw $b'$, which screw-threads into the body of the head or block, and when properly and correctly adjusted each cutter is locked and held in its adjusted position by the set-screw $b$, which also screw-threads into the body of the head or block. The construction and adjustment of the cutters or tools is one which enables the acting ends to be brought closer together or spread farther apart, according to the degree of projection given to the acting ends. The formation of the acting ends with their cutting edges on an incline produces a graduated tapered space between the acting ends, and this graduated tapered space enables bolts or bolt-blanks of different diameters to be operated upon, producing a pointing or rounding with a greater or less amount of taper or incline, according to the length of projection of the end of the bolt or bolt-blank into the space between the acting ends, less extent of projection into the space the less the taper and the greater extent of projection into the space the greater or longer the taper given to the end of the bolt or bolt-blank. It will thus be seen that bolts or bolt-blanks of different diameters can be operated upon and that any amount of pointing or rounding can be given to the end by regulating the projection of the acting end of the cutters or tools and the projection of the end of the bolt or bolt-blank into the space between the acting ends of the cutters or tools.

The head or block at its receiving end has a chamber $a$, into which the acting ends of the cutters or tools project, and leading from this central opening or chamber are discharge slots or openings $a'$, having inclined faces or bottoms $a^2$, by means of which the cuttings or shavings which are made by the operation of the cutters or tools and which drop into the central opening or chamber are discharged therefrom through the side slots or openings, and such discharge is permitted and facilitated by reason of the inclined faces or bottoms $a^2$, which prevent any clogging or stopping of the cuttings or shavings in discharging.

The head or block at its receiving or acting end is provided with a guide or centering-plate D, having a central opening or mouth $d$ for the admission and projecting into position for the operation of the cutters or tools of the end of the bolt or bolt blank, and so that such end will be central of the acting ends of the cutters or tools and be given a perfect, true, and uniform pointing or rounding. The guide or centering-plate has a screw-threaded boss or neck which enters a screw-threaded opening in the end of the head or block, and this construction enables the guide or centering-plate to be changed as required to suit bolts or bolt-blanks of different diameters, for which purpose guides or centering-plates having mouths or openings of different diameters are employed.

The head or block in the construction shown is attached to the end of a driving spindle or shaft E by having a screw-threaded socket or hole which receives the screw end $e$ of the spindle or shaft, so that with the drive of the shaft rotation will be imparted to the head or block, causing the cutters or tools to revolve around the end of the bolt or bolt-blank and point or round the end.

The bolt or bolt-blank is to be fed or entered through the mouth or opening $d'$ for its end to project into the space between the acting ends of the cutters or tools and is to be held when its end is entered or projected in any suitable manner—such as, for instance, the arrangement shown and described in my said application, Serial No. 25,637—and when the chuck or die has performed its work the bolt or bolt-blank is to be withdrawn with its end properly and correctly pointed or rounded. The operation of pointing or rounding will be rapidly performed by the action of the cutters or tools, and inasmuch as the cutters or tools have a uniform set and the space between their acting ends is likewise uniform it follows that the operation on the end of the bolt or bolt-blank will in each instance be the same, producing a regular, accurate, and uniform pointing or rounding of the ends of all the bolts or bolt-blanks operated upon, which is a result desired in the pointing or rounding of bolts or bolt-blanks or rods or other articles in which it is desirable to have a uniformity of construction.

I claim—

1. In a chuck or die for pointing or rounding, the combination of a block or head having in its body a plurality of retaining side openings or slots, each opening or slot communicating with a central end chamber in the block or head and each opening or slot having a back or inner wall inwardly converging toward the end chamber, a plurality of cutters or tools for pointing or rounding purposes, one cutter or tool for each side opening or slot, each cutter or tool having its acting end projecting endwise into the central end chamber of the block or head and set against the converging back or inner wall giving each cutter or tool an inward inclination, and means for adjusting and locking the tool in its retaining opening or slot, substantially as described.

2. In a chuck or die for pointing or rounding, the combination of a block or head having in its body a plurality of retaining side openings or slots, each opening or slot communicating with a central end chamber in the block or head and each opening or slot having a back or inner wall inwardly converging toward the end chamber longitudinally of the block or head, a plurality of cutters or tools for pointing or rounding purposes, one cutter or tool for each side opening or slot, each cutter or tool having its acting end projecting endwise into the central end chamber of the block or head and set against the converging back or inner wall giving each cutter or tool an inward inclination, an end adjusting screw or stem for each cutter or tool abutting against the end of the cutter or tool, and a side clamping stem or screw for each cutter or tool abutting against the outer side face of the cutter or tool, for the stems or screws to act and set and adjust the cutters or tools, substantially as described.

3. In a chuck or die for pointing or rounding, the combination of a block or head, a guide or centering-plate on the receiving end of the block or head, a central opening or chamber in the block or head beneath the guide or centering-plate, a series of discharge-openings leading from the central chamber outward, each discharge-opening having an inclined bottom diverging from the bottom of the central chamber, a plurality of side openings or slots in the body of the block or head, each side opening or slot communicating with the central end chamber in the block or head and each opening or slot having a back or inner wall inwardly converging toward the end chamber, a plurality of cutters or tools for pointing or rounding purposes, one cutter or tool for each side opening or slot, each cutter or tool having its acting end projecting endwise into the central end chamber of the block or head and set against the converging back or inner wall giving each cutter or tool an inward inclination, and means for adjusting and retaining each cutter or tool in its opening or slot with its cutting end projected into the central opening or chamber, substantially as described.

4. In a chuck or die for pointing or rounding, the combination of a block or head having a plurality of longitudinal slots or openings in its body converging toward a central chamber in the end of the block or head, and a plurality of cutters or tools for pointing or rounding purposes, adjustably set in the block or head and having their acting ends projected into the central chamber concentrically around such chamber with an inward inclination for the acting ends, and each acting end having an inwardly-inclined cutting edge forming a tapered or inclined space within the cutting edges, substantially as described.

5. In a chuck or die for pointing or rounding, the combination of a block or head having a plurality of longitudinal slots or openings in its body converging toward a central chamber in the end of the block or head, a plurality of cutters or tools for pointing or rounding purposes, adjustably set in the block or head and having their acting ends projected into the central chamber concentrically around such chamber with an inward inclination for the acting ends, and each acting end having an inwardly-inclined cutting edge forming a tapered or inclined space within the cutting edges, and a guide or centering-plate on the acting end of the block or head having a central hole in line with the tapered or inclined space formed by the cutting edges of the cutters or tools, substantially as described.

GEORGE W. PACKER.

Witnesses:
CHAS. N. CHAMBERS,
MARVIN CRAMER.